(12) United States Patent
Zhou et al.

(10) Patent No.: US 9,714,654 B2
(45) Date of Patent: Jul. 25, 2017

(54) OUTLET DEVICE WITH COLLECTED OUTER SOUND TO CONTROL THE WATERWAY

(75) Inventors: Huasong Zhou, Xiamen (CN); Guo-Qiang Lu, Xiamen (CN); Shuiyuan Luo, Xiamen (CN); Xianguo Zou, Xiamen (CN)

(73) Assignees: XIAMEN SOLEX HIGH-TECH INDUSTRIES CO., LTD., Xiamen (CN); Huasong Zhou, Xiamen (CN)

( * ) Notice: Subject to any disclaimer, the term of this patent is extended or adjusted under 35 U.S.C. 154(b) by 646 days.

(21) Appl. No.: 13/816,429

(22) PCT Filed: Aug. 17, 2011

(86) PCT No.: PCT/CN2011/078503
§ 371 (c)(1),
(2), (4) Date: Feb. 11, 2013

(87) PCT Pub. No.: WO2012/022259
PCT Pub. Date: Feb. 23, 2012

(65) Prior Publication Data
US 2013/0136627 A1 May 30, 2013

(30) Foreign Application Priority Data

Aug. 20, 2010 (CN) .......................... 2010 1 0259195
Aug. 20, 2010 (CN) ..................... 2010 2 0299875 U (51) Int. Cl.
| E03C 1/05 | (2006.01) |
| F04B 53/00 | (2006.01) |
| B05B 12/12 | (2006.01) |
| F03B 13/00 | (2006.01) |
| B05B 1/18 | (2006.01) |
| B05B 3/04 | (2006.01) |

(52) U.S. Cl.
CPC ............ *F04B 53/001* (2013.01); *B05B 12/12* (2013.01); *E03C 1/057* (2013.01); *F03B 13/00* (2013.01);
(Continued)

(58) Field of Classification Search
CPC ....... E03C 1/057; G01H 11/08; F16K 19/006; F04B 53/001; F03B 13/00; B05B 12/12;
(Continued)

(56) References Cited

U.S. PATENT DOCUMENTS 2,832,018 A * 4/1958 Laub ............................. 318/644
4,061,927 A * 12/1977 Link .............................. 307/41
(Continued)

FOREIGN PATENT DOCUMENTS

| CN | 1131063 A | 9/1996 |
| CN | 2923040 Y | 7/2007 |

(Continued)

*Primary Examiner* — William McCalister
*Assistant Examiner* — Ian Paquette
(74) *Attorney, Agent, or Firm* — Rabin & Berdo, P.C.

(57) ABSTRACT

An outlet device with collected the outer sound to control the waterway includes a shower, an electromagnetic valve, a control module and a power module with an impeller and a generator. The control module includes a sound detecting module, a calculating module, a processing module and a driving module. The sound detecting module collects the outer sound and outputs the control signal; the calculating module is connected to the power module to determine whether the real-time flowing value exceeds the preset value. If it exceeds the present value, the control module and the electromagnetic valve are turned off. The calculating module is connected to the sound detecting module and outputs the driving signal after receiving the control signal. The driving module is connected to the processing module and the electromagnetic valve. The driving module drives the electromagnetic valve when receiving the driving signal.

9 Claims, 10 Drawing Sheets (52) U.S. Cl.
CPC . *B05B 1/18* (2013.01); *B05B 3/04* (2013.01); *F05B 2220/20* (2013.01); *F05B 2220/602* (2013.01); *Y02B 10/50* (2013.01)

(58) Field of Classification Search
CPC ... B05B 3/04; B05B 1/18; Y02B 10/50; F05B 2220/602; F05B 2220/20; G01S 7/354; G01S 7/415; G01S 13/56
USPC .................................................. 251/129.04
See application file for complete search history.

(56) References Cited

U.S. PATENT DOCUMENTS

| | | | | |
|---|---|---|---|---|
| 4,604,735 | A | * | 8/1986 | Parsons ............................ 367/93 |
| 4,918,426 | A | * | 4/1990 | Butts et al. .................... 340/611 |
| 5,349,985 | A | * | 9/1994 | Fischer .......................... 137/607 |
| 5,868,311 | A | * | 2/1999 | Cretu-Petra ............. E03C 1/057 236/12.12 |
| 6,405,939 | B1 | | 6/2002 | Mazzenga et al. |
| 2009/0106891 | A1 | * | 4/2009 | Klicpera ............................ 4/605 |
| 2010/0200789 | A1 | * | 8/2010 | Connors .................. 251/129.04 |
| 2011/0289675 | A1 | * | 12/2011 | Dunki-Jacobs et al. .......... 4/668 |
| 2014/0345726 | A1 | * | 11/2014 | Seggio et al. ................ 137/606 |

FOREIGN PATENT DOCUMENTS

| | | |
|---|---|---|
| CN | 101518760 A | 9/2009 |
| CN | 101940992 A | 1/2011 |
| CN | 201735468 U | 2/2011 |
| JP | 2007170135 A | 7/2007 |

* cited by examiner

OUTLET DEVICE WITH COLLECTED OUTER SOUND TO CONTROL THE WATERWAY

FIELD OF THE INVENTION

The present invention relates to an outlet device with collected outer sound to control the waterway.

BACKGROUND OF THE INVENTION

The traditional outlet device employs a manual control switch. There are still weak points in it: firstly, as it is manual control, the switch is easily worn, the service life of the switch is short; secondly, in some situation, such as in the public, it will make the user's hands dirty; thirdly, it's difficult to use by some people, such as blind men and children.

To solve above problems and disadvantages, there are inductive control switch applied in the outlet device, such as infrared ray inductive switch. This method solves the problems of the traditional outlet device, there are disadvantages: user has to reach his hand to the inductive area of the inductive switch. The inductive area is limited, making the usage inconvenient.

SUMMARY OF THE INVENTION

The present invention is provided with an outlet device with collected the outer sound to control the waterway, which overcomes the disadvantages of the existing technology.

The technical proposal of the present invention to solve the technical problem is as below:

An outlet device with collected the outer sound to control the waterway includes a shower with at least one waterway, at least one electromagnetic valve disposed inside the shower to control the switch of the waterway, a control module and a power module to power the control module and the electromagnetic valve, the control module includes:

A sound detecting module, which collects the outer sound and outputs the control signal after receiving the sound;

A calculating module, which is assembled in the waterway to acquire the flowing information of the waterway;

A processing module, which is connected to the calculating module and the sound detecting module, the processing module receives the flowing information of the calculating module and determines whether to turn on the sound detecting module or not according to the flowing information, the processing module then receives the control signal of the sound detecting module and outputs the driving signal according to the control signal; and A driving module, which is connected to the processing module and the electromagnetic valve, the driving module drives the electromagnetic valve when received the driving signal.

In another preferred embodiment, the power module includes an impeller and a generator, the impeller is disposed inside the waterway and the impeller rotates by the current of the shower, the generator generates electricity when the impeller rotates relative to the generator;

The calculating module is connected to the power module and acquires the real-time rotating speed information of the impeller, the rotating speed information is the flowing information;

The processing module is connected to the calculating module and acquired the real-time rotating speed through the real-time rotating speed information to judge that whether there is the rotating speed signal, if not, the outlet device will stop working, the processing module is connected to the sound detecting module and outputs driving signal when received the control signal.

In another preferred embodiment, the power module includes a battery, the batter supplies power to the outlet device;

The calculating module is connected to a water pressure transducer or a flow transducer to acquire the flowing information;

The process module is connected to the calculating module to acquire the flowing information and determined whether to turn on the sound detecting module or not according to the flowing information, the processing module is acquired the control signal of the sound detecting module and outputs the driving signal according to the control signal.

In another preferred embodiment, the power module further includes a power generating circuit, which includes a rectifier circuit, a filter circuit and a voltage stabilizing circuit, the rectifier circuit is connected to the generator to convert the alternating current generated by the generator to pulsating direct current, the filter circuit is connected to the rectifier circuit to covert the pulsating direct current to smoothed direct current, the voltage stabilizing circuit is connected to the filter circuit to convert the smoothed direct current to stable direct current.

In another preferred embodiment, the control module further includes an indicating module with a light emitting diode, the indicating module is signal connected to the processing module to indicate the status of the control module.

In another preferred embodiment, the sound detect module includes a piezoelectric buzzer and a signal amplifier, the piezoelectric buzzer is collected the outer sound and outputs level signal when the strength of the signal amplifier is higher than preset strength, the signal amplifier is used to amplify the level signal and outlet low level in the output terminal, the low level is the control signal.

In another preferred embodiment, the driving module includes two amplifiers, the inputs of the two amplifiers are separately connected to the two outputs of the processing module to acquire the driving signal, the two outputs of the two amplifiers are separately connected to the two electrodes of the electromagnetic valve.

In another preferred embodiment, the two amplifiers are a first amplifier and a second amplifier;

The first amplifier includes a triode Q1, a triode Q4 and a triode Q6;

The base of the triode Q4 is connected to one output of the processing module through a resistance R4, the emitter of the triode Q4 is earthed, the collector of the triode Q4 is connected to the base of the triode Q1 through a resistance R1;

The emitter of the triode Q1 is connected to the power VCC, the collector of the triode Q1 is connected to the collector of the triode Q6; the emitter of the triode Q6 is earthed;

The second amplifier includes a triode Q2, a triode Q3 and a triode Q5;

The base of the triode Q3 is connected to another output of the processing module through a resistance R5, the emitter of the triode Q3 is earthed, the collector of the triode Q3 is connected to the base of the triode Q2 through a resistance R3; The emitter of the triode Q2 is connected to the power VCC, the collector of the triode Q2 is connected to the collector of the triode Q5; the emitter of the triode Q5 is earthed;

The base of the triode Q6 is connected to the collector of the triode Q2, the base of the triode Q5 is connected to the collector of triode Q1 through a resistance R7;

The two electrodes of the electromagnetic valve are separately connected to the collector of the triode Q1 and the collector of the triode Q2.

In another preferred embodiment, the number of the waterways is two, the number of the electromagnetic valves is two, the two electromagnetic valves are separately used to control the two waterways; the processing module is generated a first driving signal and a second driving signal to separately drive the two electromagnetic valves.

Compared to the existing technology, the technical proposal of the present invention has advantages as below:

1. The present invention is collected the outer sound to control the waterway, the control area is not limited, people use it with convenience, especially to the disabled and the children, it's also convenient for the outlet device with high arranged valve; with the power module, the calculating module and the processing module, in the waterway with low water pressure or low flowing rate, the calculating module outputs the real-time flowing information of the waterway in low water pressure or low flowing rate to the processing module, the processing module judges that the comparative valve of the real-time flowing value and the preset value to control to close the control module and the electromagnetic valve to prevent mistake and lengthen the service life of the control module and the electromagnetic valve;

2. The power generating circuit includes a rectifier circuit, a filter circuit and a voltage stabilizing circuit, making sure that the output voltage is stabilized voltage and that the control module and the electromagnetic valve is worked in a proper voltage; it prevents mistake, lengthening the service life of the control module and the electromagnetic valve;

3. The present invention further includes LED indicating module for the user to catch the work of the control module and the electromagnetic valve;

4. The sound detecting module includes a piezoelectric buzzer and a signal amplifier, preventing the interference of the other signal;

5. The driving module includes an amplifier to amplify the driving signal to control the electromagnetic valve;

6. With six triodes to amplify the driving signal, the driving signal is amplified to prevent the interference of other signal and prevent the processing module from interference of the electromagnetic valve signal;

7. Two electromagnetic valves are separately used to control the two waterways, and controlled the switch of the two waterways by sound; the first driving signal and the second driving signal are opposite. If the first driving signal is on signal, the second driving signal is off signal. If the second driving signal is on signal, the first driving signal is off signal.

BRIEF DESCRIPTION OF THE DRAWINGS

The present invention will be further descried with the drawings and embodiments.

DETAILED DESCRIPTION OF THE EMBODIMENT

The First Embodiment

Refer to the FIG. 1 to FIG. 6. The present invention is provided with an outlet device with collected outer sound to control the waterway. It includes a shower 100, two electromagnetic valves 200, a control module 300 and a power module 400. The control module 300 is disposed inside the shower 100.

The shower is disposed with a root waterway 110 and two diversion waterways 120, the two diversion waterways 120 and the root waterway 110 are separately disposed with an electromagnetic valve 200, which can control the corresponding diversion waterway 120 to connect to the root waterway 110 and control the diversion waterway 120 to outlet, the switch of the two diversion waterways 120 is realized and controlled by the two electromagnetic valves 200.

Figure 8:
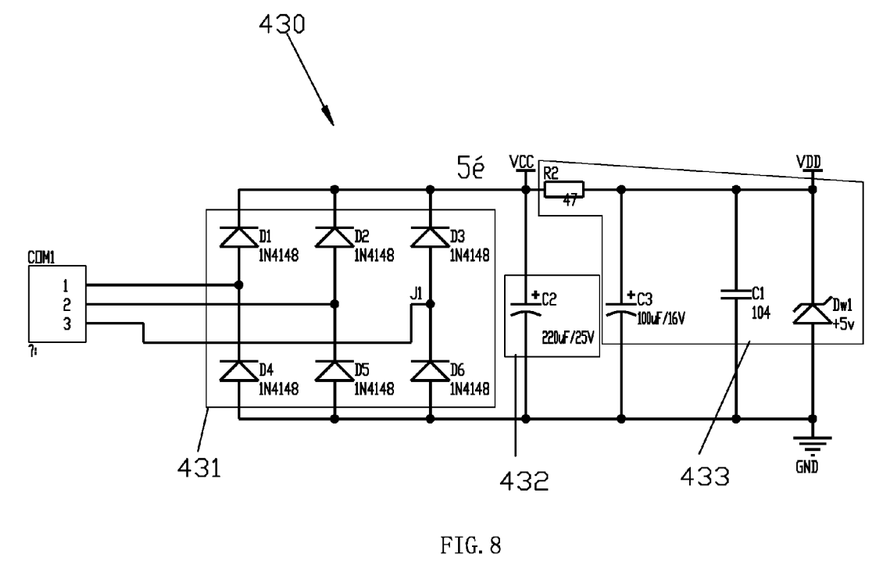
FIG. 8 illustrates the power generating circuit of the first embodiment of the present invention.

The power module 400 includes an impeller 410, a generator 420 and a power generating circuit 430. The generator 420 is fixed inside the shower 100, the impeller 410 is rotated and disposed in the cavity 440 of the root waterway 110 and impacted by the water flowing when the water flows through the root waterway 110 of the shower 100 (for example the cavity 440 is disposed with inclined inlet and outlet), the impeller 410 rotates relatively to the generator 420 to generate power. Refer to the FIG. 8. the power generating circuit 430 includes a rectifier circuit 431, a filter circuit 432 and a voltage stabilizing circuit 433, the rectifier circuit 431 is connected to the generator 420 to convert the alternating current generated by the generator 420 to pulsating direct current, the filter circuit 432 is connected to the rectifier circuit 431 to covert the pulsating direct current to smoothed direct current, the voltage stabilizing circuit 433 is connected to the filter circuit 432 to convert the smoothed direct current to stable direct current. In this embodiment, the generator 420 is connected to the COM1, the rectifier circuit 431 is connected to the COM1, the rectifier circuit 431 includes diodes D1-D6; the filter circuit 432 includes a capacitance C2; the voltage stabilizing circuit 433 includes a resistance R2, capacitances C3 and C1 and a VR-tube DW1. The power module 400 is used to supply power to the microcontroller of the control module 300 and the electromagnetic valve 200.

Figure 1:
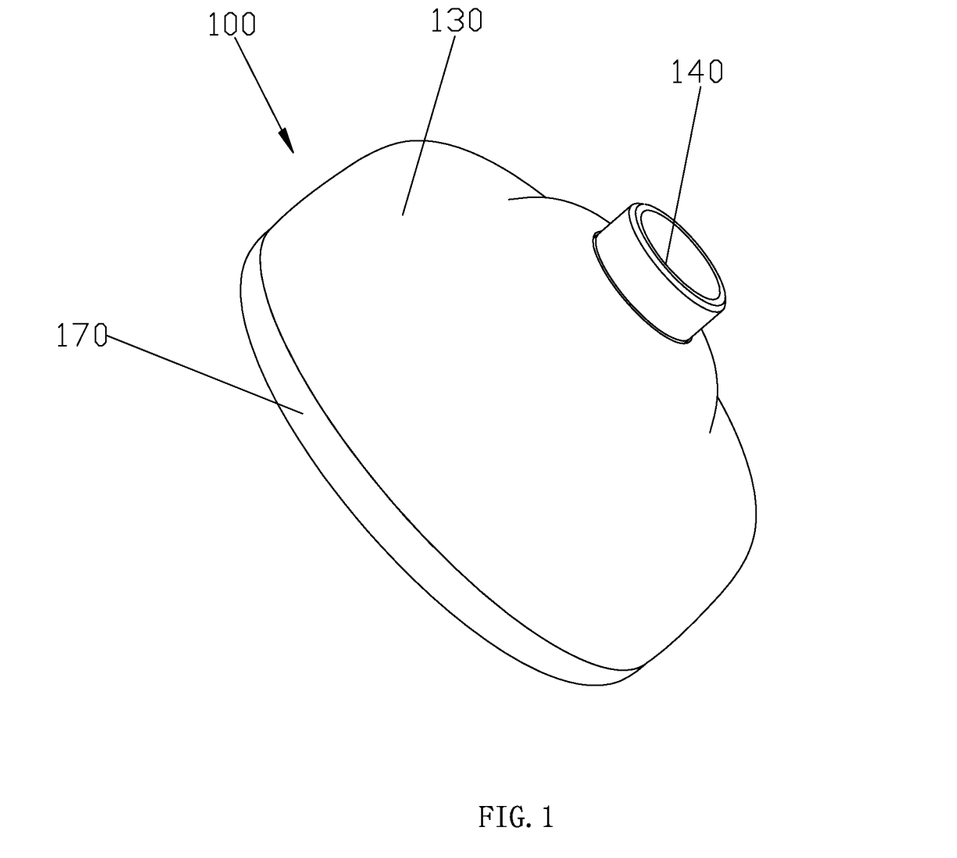
FIG. 1 illustrates the structure of the outlet device of the first embodiment of the present invention.
Figure 2:
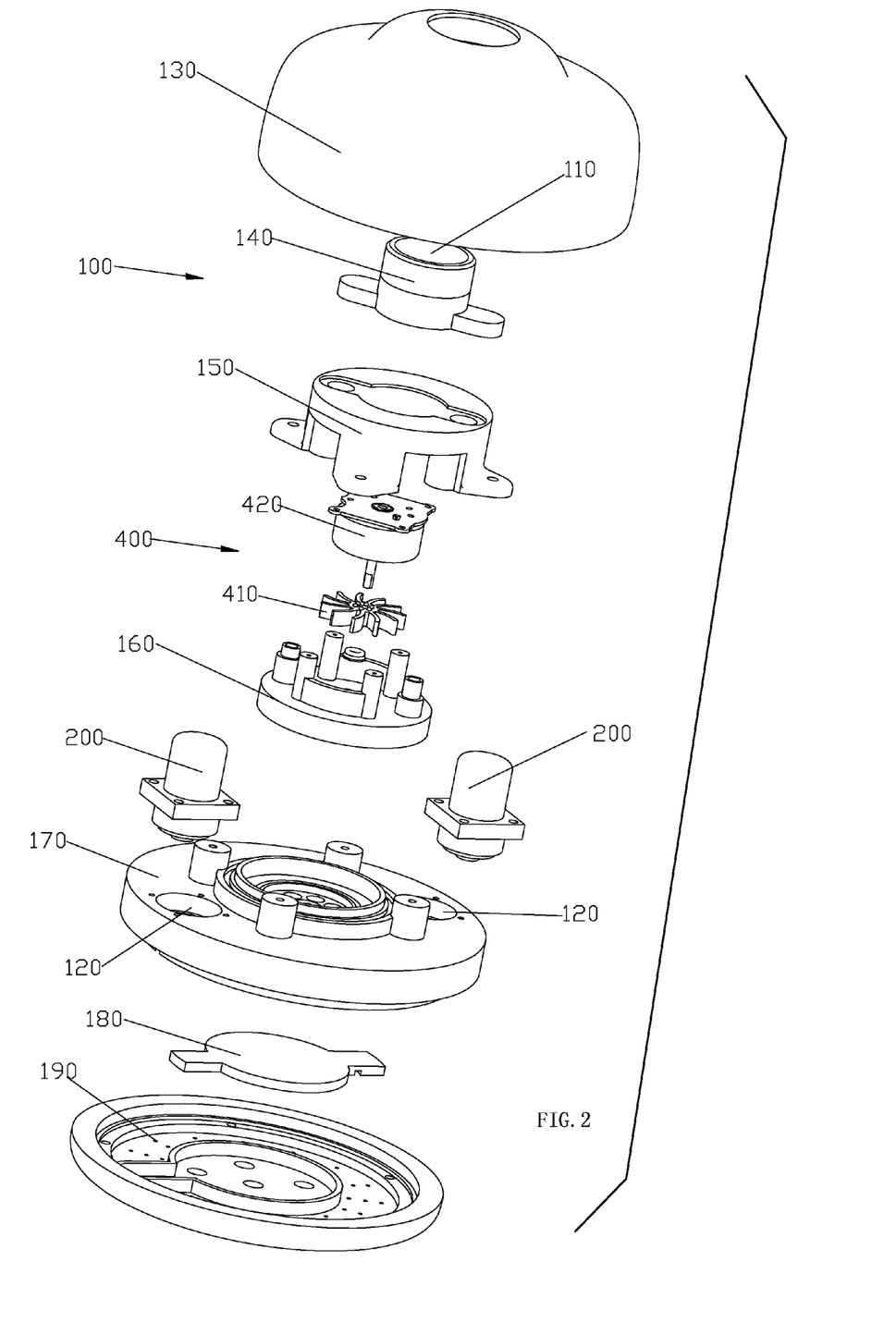
FIG. 2 illustrates the breakdown structure of the outlet device of the first embodiment of the present invention.
Figure 3:
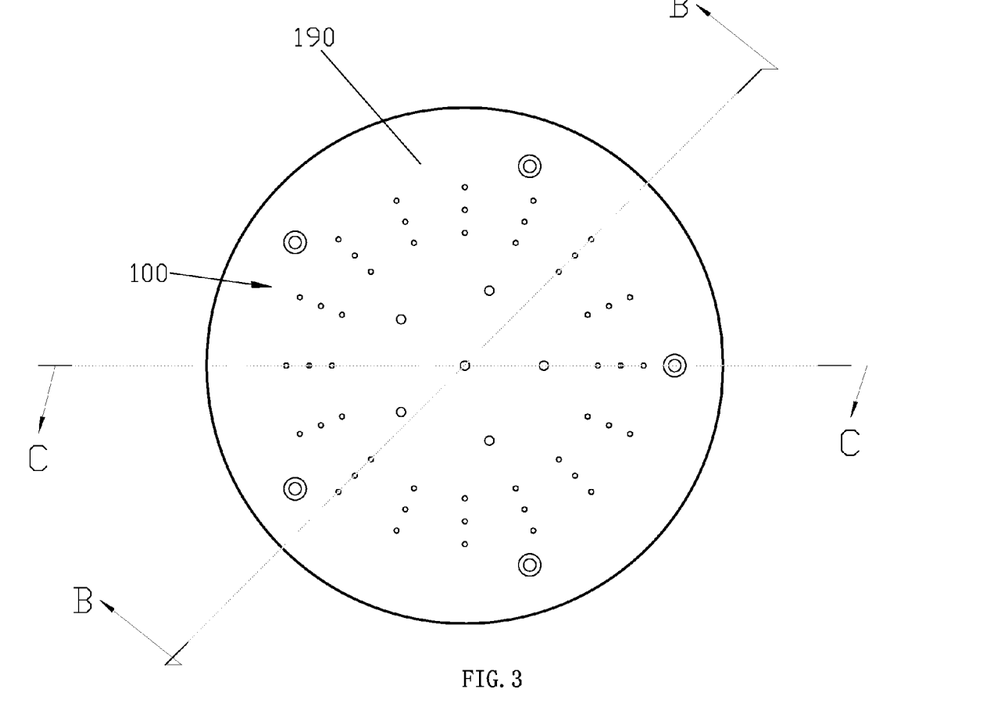
FIG. 3 illustrates the bottom view of the outlet device of the first embodiment of the present invention.
Figure 4:
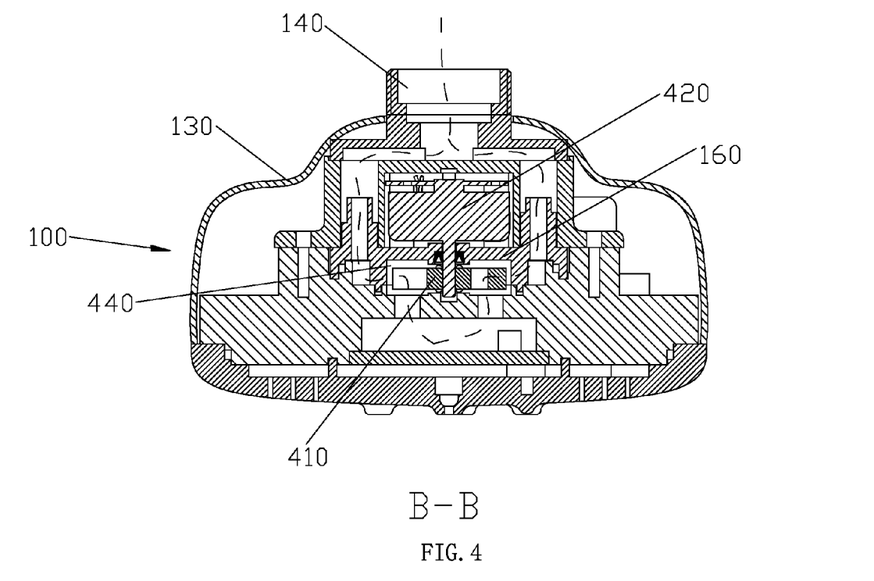
FIG. 4 illustrates the sectional view of the B-B of the FIG. 3.
Figure 5:
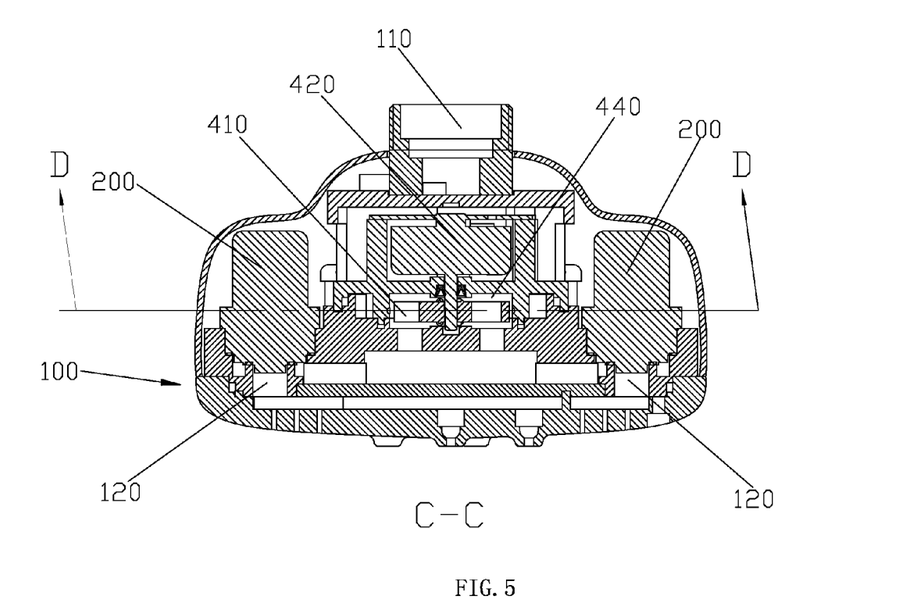
FIG. 5 illustrates the sectional view of the C-C of the FIG. 3.
Figure 6:
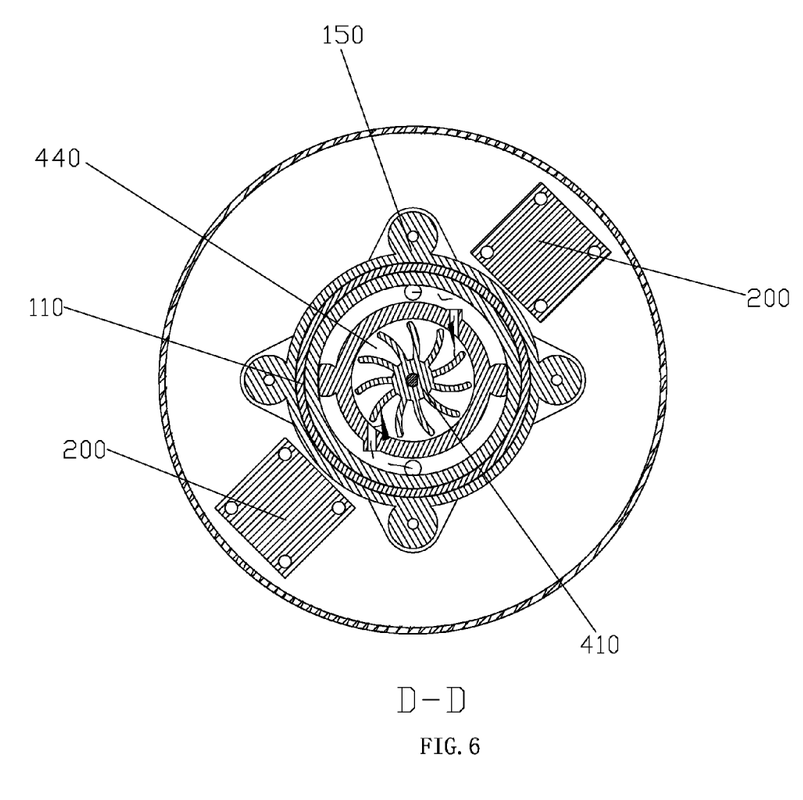
FIG. 6 illustrates the sectional view of the D-D of the FIG. 3.
Figure 7:
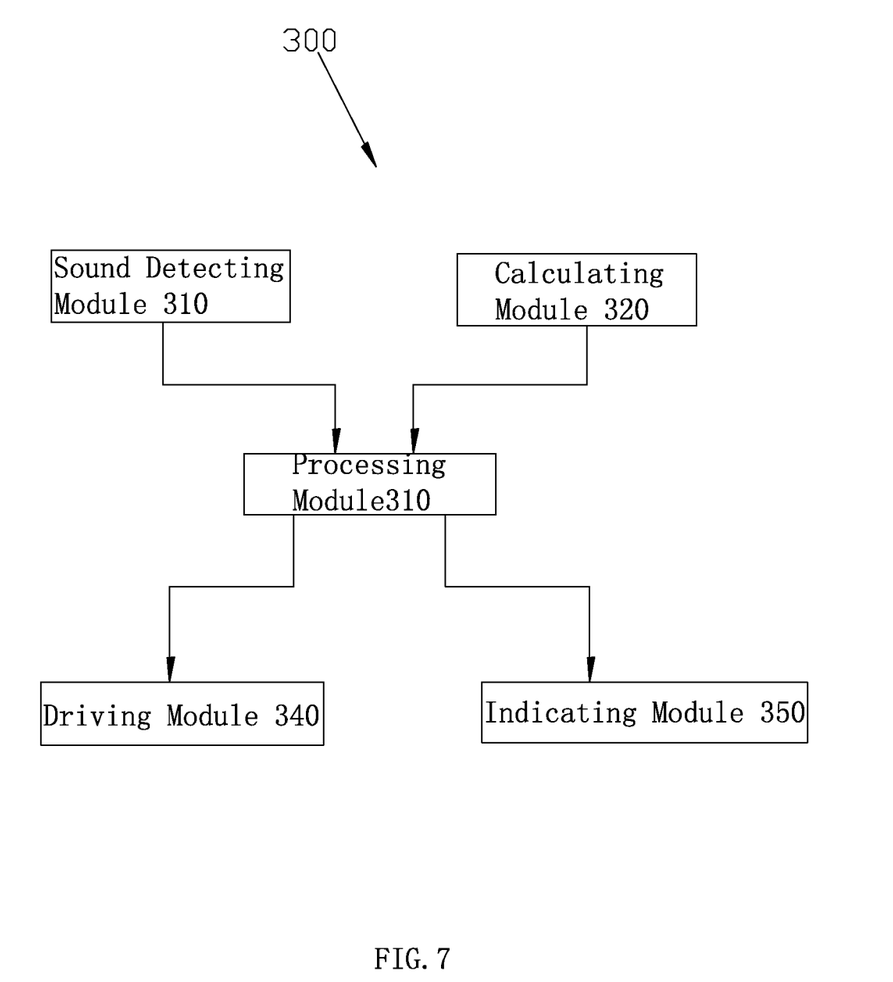
FIG. 7 illustrates the block diagram of the control module of the first embodiment of the present invention.

Refer to the FIG. 7. The control module 300 includes a sound detecting module 310, a calculating module 320, a processing module 330, two driving modules 340 and an indicating module 350.

Figure 9:
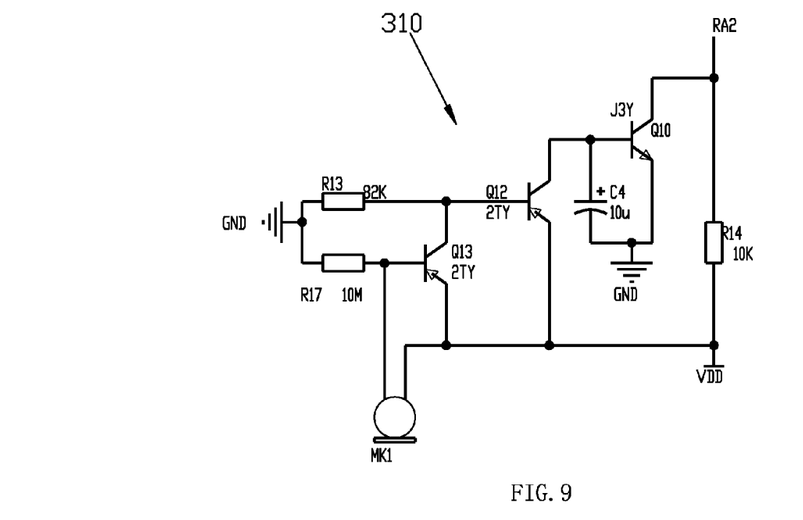
FIG. 9 illustrates the sound detecting module of the first embodiment of the present invention.

The sound detecting module 310 collects the outer sound and outputs a control signal after receiving the sound. Referring to FIG. 9. the sound detecting module 310 includes a piezoelectric buzzer MK1 and a signal amplifier, the piezoelectric buzzer MK1 collects the outer sound and outputs a pulsing signal when the strength of the signal amplifier is higher than preset strength, the signal amplifier is used to amplify the pulsing signal and output a low level at the output terminal, where the low level is the control signal. In this embodiment, the sound is amplified by the Q13, Q12 and Q10 through the piezoelectric buzzer MK1, and the sound signal is converted to the low level at the RA2 point and output to the microcontroller. In this embodiment, in the normal state, the impedance of MK1 is high, Q13 is off, the base of Q12 is at a high level, Q12 is off, Q10 is off, the point RA2 is at a high level; when the sound signal is collected, MK1 generates the pulsing signal, Q13 is on, the base of Q12 goes down to a low level, Q12 is on, the base of Q10 goes to a high level, then Q10 is on, making the RA2 level go down to the low level.

Figure 10:
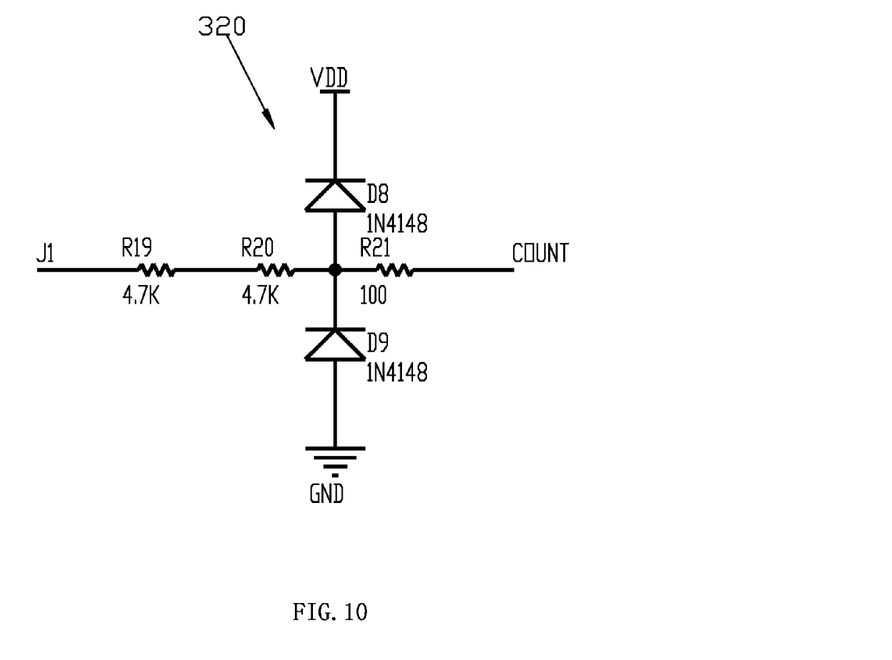
FIG. 10 illustrates the calculating module of the first embodiment of the present invention.

The calculating module 320 is connected to the power module 400 and calculated the real-time rotating speed of the impeller 410. Refer to the FIG. 10. The calculating module 320 is connected to the J1 of the rectifier circuit of the power generating circuit 430, the pulsing signal of the J1 is current limited through the R19 and R20, and shaped through the D8 and D9, making the pulsing signal of J1 of the generator 420 shaped and then output to the R21 of the processing module 330 for calculating the real-time rotating speed (in this embodiment, the second pin of the microcontroller is worked to calculating).

Figure 11:
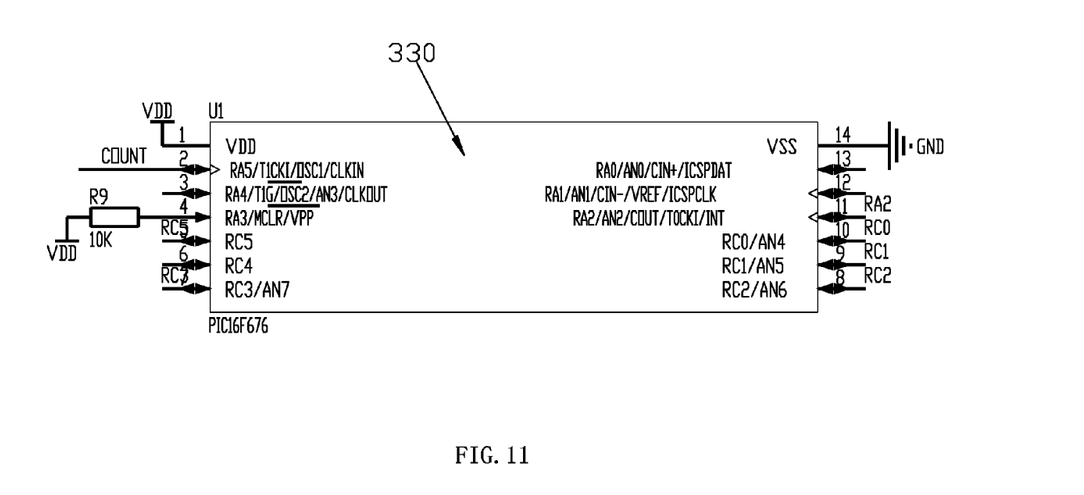
FIG. 11 illustrates the processing module of the first embodiment of the present invention.

The processing module 330 is connected to the calculating module 320 and the sound detecting module 310. Refer to the FIG. 11. In this embodiment, the processing module 330 is applied with microcontroller PIC6F676 to process the signal coming from outside, and control the indicating module 350 and electromagnetic valve 200. The microcontroller PIC6F676 is connected to the calculating module 320. The microcontroller PIC6F676 is connected to the calculating module 320 and calculated the real-time rotating speed through the pulsing signal and judged that whether the real-time rotating speed is less than the preset speed. If the real-time rotating speed is less than the preset speed, turn off the control module, the electromagnetic valve and the indicating module (output the flash signal and the LED flashes), if not, the control module, the electromagnetic valve and the indicating module (the LED is lighting) are worked. In this embodiment, when the rotating speed of the generator is lower than 1500 r/min, the microcontroller PIC6F676 controls the LED lights and releases the control to the electromagnetic valve. When the rotating speed of the generator is higher than 1500 r/min, the control module, the electromagnetic valve and the indicating module (the LED lights) are worked. The microcontroller PIC6F676 is connected to the sound detecting module and outputs a first driving signal and a second driving signal when received the control signal. That is to say, the microcontroller PIC6F676 judges that whether the signal the sound detecting module output is low level, if yes, the driving signal and lighting signal are output.

Figure 12:
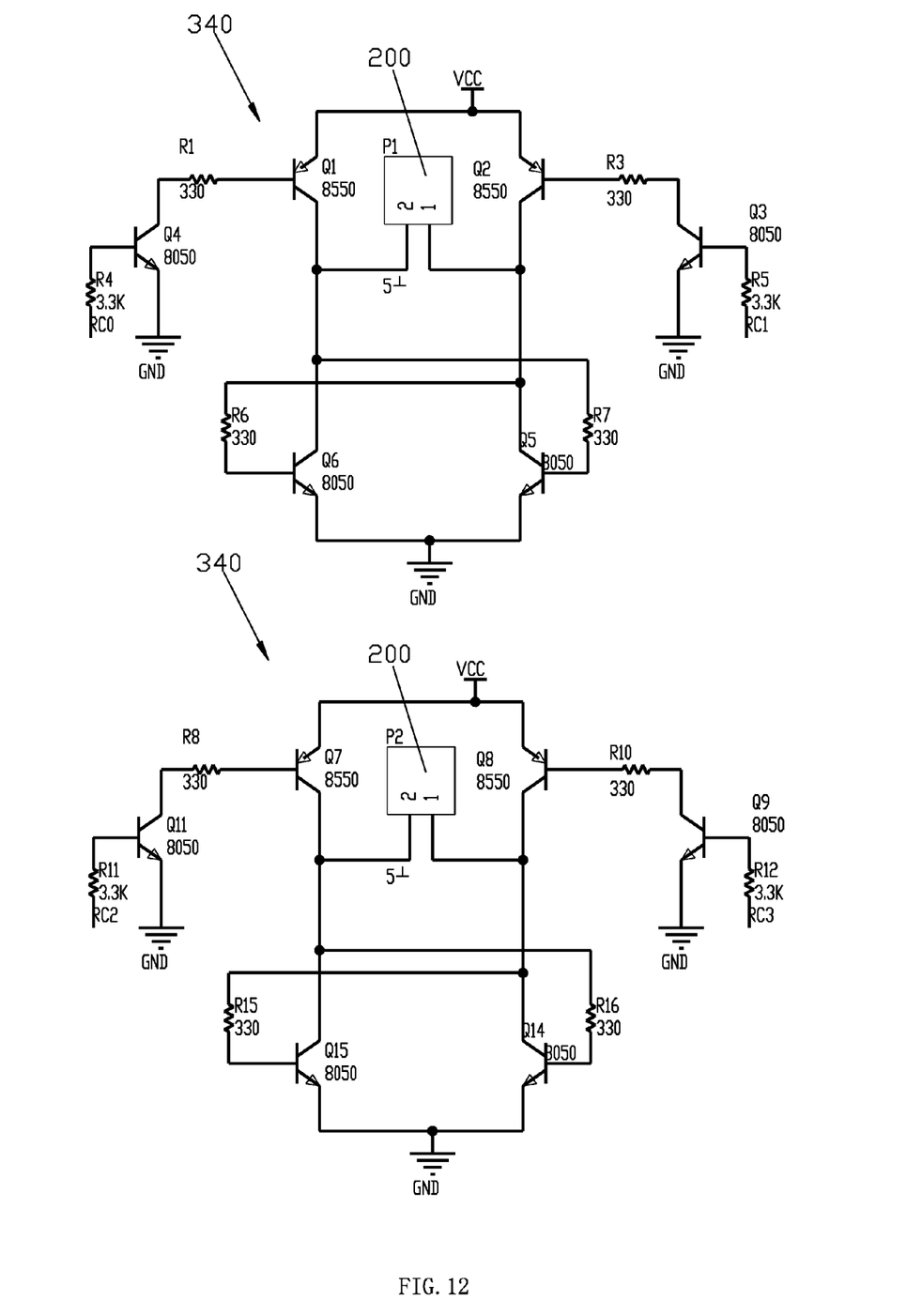
FIG. 12 illustrates the driving circuit of the first embodiment of the present invention.

The two driving modules 340 are connected to the processing module 330 and the electromagnetic valve 200, and driven the first electromagnetic valve 200 and the second electromagnetic valve 200 on and off after received the first driving signal and the second driving signal. Refer to the FIG. 12, the first driving module 340 includes two amplifiers, which are the first amplifier and the second amplifier. In this embodiment, the first amplifier includes a triode Q1, a triode Q4 and a triode Q6; The base of the triode Q4 is connected to one output of the processing module through a resistance R4, the emitter of the triode Q4 is earthed, the collector of the triode Q4 is connected to the base of the triode Q1 through a resistance R1;

The emitter of the triode Q1 is connected to the power VCC, the collector of the triode Q1 is connected to the collector of the triode Q6; the emitter of the triode Q6 is earthed; the second amplifier includes a triode Q2, a triode Q3 and a triode Q5; the base of the triode Q3 is connected to another output of the processing module through a resistance R5, the emitter of the triode Q3 is earthed, the collector of the triode Q3 is connected to the base of the triode Q2 through a resistance R3; the emitter of the triode Q2 is connected to the power VCC, the collector of the triode Q2 is connected to the collector of the triode Q5; the emitter of the triode Q5 is earthed; the base of the triode Q6 is connected to the collector of the triode Q2, the base of the triode Q5 is connected to the collector of triode Q1 through a resistance R7; the two electrodes of the electromagnetic valve 200 are separately connected to the collector of the triode Q1 and the collector of the triode Q2. The second driving module 340 includes two amplifiers, the compositing of which is similar to the first driving module 340, the first amplifier includes a triode Q7, a triode Q8 and a triode Q15. The other amplifier includes a triode Q8, a triode Q9 and a triode Q14.

Figure 13:
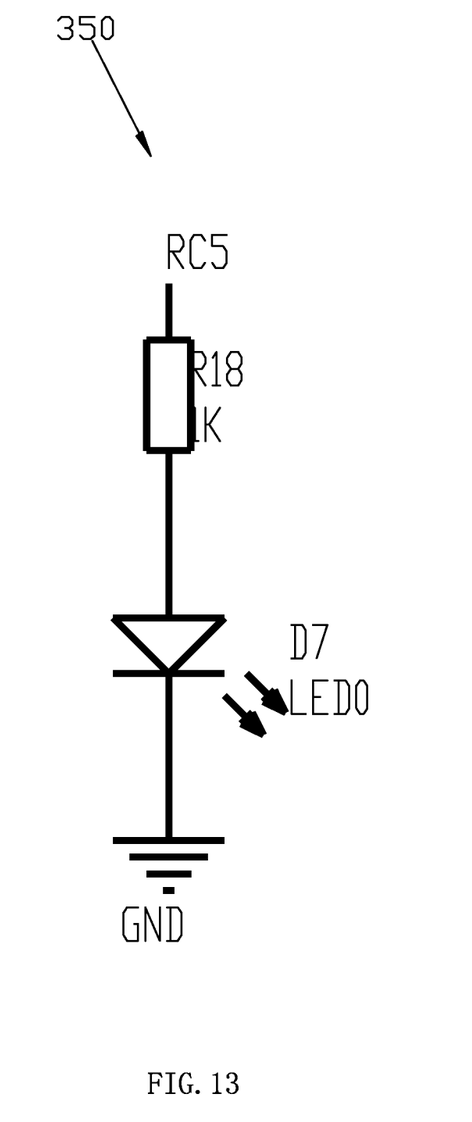
FIG. 13 illustrates the indicating circuit of the first embodiment of the present invention.

Refer to the FIG. 13. The indicating module 350 with LED is signal connected to the processing module to indicate the state of the control module. The LED flashes when received the flashing signal and lights when received the lighting signal. In this embodiment, the indicating module 350 includes LED D7 and resistance R18.

Refer to the FIG. 1 to FIG. 6. The shower 100 includes a shell 130, an inlet joint 140, a water body 150, a generator support 160, a water diversion body 170, a water seal board 180 and a cover 190. The shell 130, the inlet joint 140, the water body 150, the generator support 160, the water diversion body 170, the water seal board 180 and the cover 190 are fixed together to form the root waterway 110 and the two diversion waterways 120. The generator 420 is assembled in the generator support 160, the impeller 410 is pivot jointed to the generator support 160.

The Second Embodiment

Figure 14:
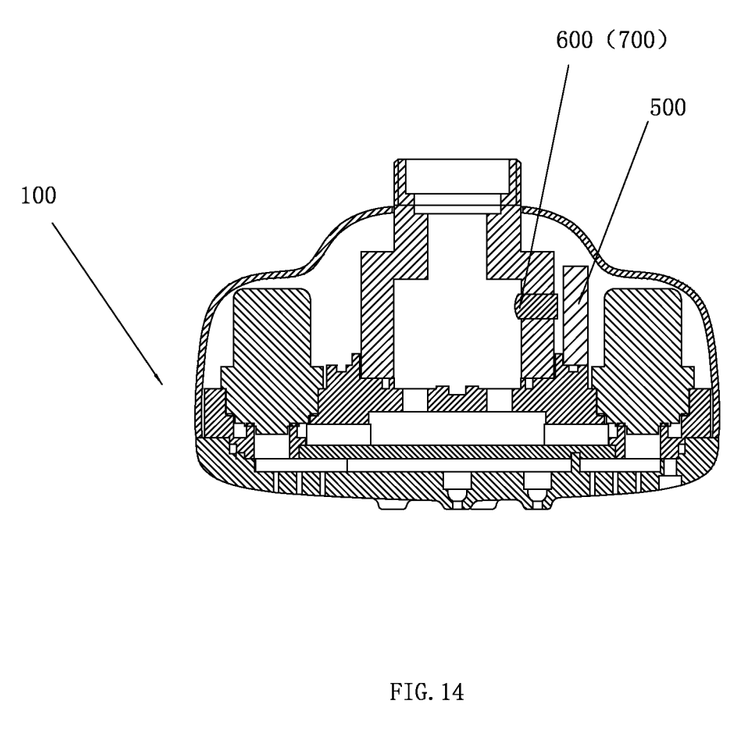
FIG. 14 illustrates the sectional view of the second embodiment of the present invention.

Refer to the FIG. 14 of the second embodiment of the present invention. The different from the first embodiment is that: the power supply is applied with a battery 500, the calculating module is applied with water pressure transducer 600 (or water flowing transducer 700), the control module is acquired the real-time water pressure of the water pressure transducer 600 (water flowing transducer 700) and judged that the values of the real-time water pressure information (the real-time water flowing information) and the preset water pressure information (the preset water flowing information), if the real-time water pressure (the real-time water flowing information) is smaller than the preset water pressure (the preset water flowing information), the electromagnetic valve and the control module are turned off.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention of an outlet device with collected the outer sound to control the waterway is collected the outer sound to control the waterway, the control area is not limited, people use it with convenience, especially to the disabled and the children, it's also convenient for the outlet device with high arranged valve.

What is claimed is:

1. An outlet device,
the outlet device detecting an outer sound in an area that is external to a waterway to control the waterway, comprising:
a shower with at least one said waterway,
at least one electromagnetic valve disposed inside the shower to control switching of the waterway,
a control module and a power module to power the control module and the electromagnetic valve,
the control module includes:
a sound detecting module, which detects the outer sound and outputs a control signal after the outer sound is received;
a calculating module, which is assembled in the waterway to acquire the flowing information of the waterway;
a processing module, which is connected to the calculating module and the sound detecting module,
the processing module receives the flowing information of the calculating module and determines whether to turn on the sound detecting module or not according to the flowing information,
the processing module then receives the control signal of the sound detecting module and outputs the driving signal according to the control signal; and
a driving module, which is connected to the processing module and the electromagnetic valve, the driving module drives the electromagnetic valve when the driving signal is received,
wherein the sound detecting module includes a piezoelectric buzzer and a signal amplifier,
the piezoelectric buzzer collects the outer sound and outputs a pulsing signal when an output strength of the signal amplifier is higher than a preset strength, and
the signal amplifier is used to amplify the pulsing signal and output a low level signal at an output terminal, where the low level signal is the control signal.

2. The outlet device according to claim 1, wherein:
the power module includes a battery, the battery supplies power to the outlet device;
the calculating module is connected to a water pressure transducer or a flow transducer to acquire the flowing information;
the process module is connected to the calculating module to acquire the flowing information and determined whether to turn on the sound detecting module or not according to the flowing information,
the processing module acquires the control signal of the sound detecting module and output the driving signal according to the control signal.

3. The outlet device according to claim 1, wherein
the control module further includes an indicating module with a light emitting diode,
the indicating module is signal connected to the processing module to indicate the status of the control module.

4. The outlet device according to claim 1, wherein
the number of the waterways is two,
the number of the electromagnetic valves is two,
the two electromagnetic valves are separately used to control the two waterways;
the processing module is generated a first driving signal and a second driving signal to separately drive the two electromagnetic valves.

5. The outlet device according to claim 1, wherein
the driving module includes two amplifiers,
the inputs of the two amplifiers are separately connected to the two outputs of the processing module to acquire the driving signal,
the two outputs of the two amplifiers are separately connected to the two electrodes of the electromagnetic valve.

6. The outlet device according to claim 5, wherein:
the two amplifiers are a first amplifier and a second amplifier;
the first amplifier includes a triode Q1, a triode Q4 and a triode Q6;
the base of the triode Q4 is connected to one output of the processing module through a resistance R4,
the emitter of the triode Q4 is earthed,
the collector of the triode Q4 is connected to the base of the triode Q1 through a resistance R1;
the emitter of the triode Q1 is connected to the power VCC,
the collector of the triode Q1 is connected to the collector of the triode Q6;
the emitter of the triode Q6 is earthed;
the second amplifier includes a triode Q2, a triode Q3 and a triode Q5;
the base of the triode Q3 is connected to another output of the processing module through a resistance R5,
the emitter of the triode Q3 is earthed,
the collector of the triode Q3 is connected to the base of the triode Q2 through a resistance R3;
the emitter of the triode Q2 is connected to the power VCC,
the collector of the triode Q2 is connected to the collector of the triode Q5;
the emitter of the triode Q5 is earthed;
the base of the triode Q6 is connected to the collector of the triode Q2,
the base of the triode Q5 is connected to the collector of triode Q1 through a resistance R7;
the two electrodes of the electromagnetic valve are separately connected to the collector of the triode Q1 and the collector of the triode Q2.

7. The outlet device according to claim 1, wherein:
the power module includes an impeller and a generator, the impeller is disposed inside the waterway and the impeller rotates by the current of the shower, the generator generates electricity when the impeller rotates relatively to the generator;

the calculating module is connected to the power module and acquires the real-time rotating speed information of the impeller, the rotating speed information is the flowing information;

the processing module is connected to the calculating module and acquires the real-time rotating speed through the real-time rotating speed information to judge that whether there is the rotating speed signal, if not, the outlet device will stop working, the processing module is connected to the sound detecting module and outputs driving signal when the control signal is received.

8. The outlet device according to claim 7, wherein the power module further includes a power generating circuit, which includes a rectifier circuit, a filter circuit and a voltage stabilizing circuit, the rectifier circuit is connected to the generator to convert the alternating current generated by the generator to pulsating direct current, the filter circuit is connected to the rectifier circuit to covert the pulsating direct current to smoothed direct current, the voltage stabilizing circuit is connected to the filter circuit to convert the smoothed direct current to stable direct current.

9. The outlet device according to claim 7, wherein the number of the waterways is two, the number of the electromagnetic valves is two, the two electromagnetic valves are separately used to control the two waterways;

the processing module is generated a first driving signal and a second driving signal to separately drive the two electromagnetic valves.

\* \* \* \* \*